(12) United States Patent
De Schutter

(10) Patent No.: US 12,187,990 B2
(45) Date of Patent: *Jan. 7, 2025

(54) METHOD FOR TREATING A WORT IN A BOILING KETTLE

(71) Applicant: ANHEUSER-BUSCH INBEV S.A., Brussels (BE)

(72) Inventor: David De Schutter, Leuven (BE)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,461

(22) Filed: Jun. 12, 2023

(65) Prior Publication Data

US 2023/0323258 A1 Oct. 12, 2023

Related U.S. Application Data

(63) Continuation of application No. 15/033,880, filed as application No. PCT/EP2014/074010 on Nov. 7, 2014, now Pat. No. 11,725,166.

(30) Foreign Application Priority Data

Nov. 7, 2013 (EP) .................................... 13191922

(51) Int. Cl.
*C12C 7/22* (2006.01)
*C12C 13/08* (2006.01)

(52) U.S. Cl.
CPC ................ *C12C 7/22* (2013.01); *C12C 13/08* (2013.01)

(58) Field of Classification Search
CPC .. C12C 7/00; C12C 13/00; C12C 7/20; C12C 7/22

(Continued)

(56) References Cited

U.S. PATENT DOCUMENTS

| 4,495,204 A | 1/1985 | Weaver et al. |
| 4,550,029 A | 10/1985 | Krüger et al. |

(Continued)

FOREIGN PATENT DOCUMENTS

| AT | 506810 A4 | 12/2009 |
| CA | 2292606 A1 | 11/1998 |

(Continued)

OTHER PUBLICATIONS

"No Boil Experiment, Mad Science in the Pursuit of Great Beer—Homebrew with Denny Conn and Drew Beechum", Posted by user Dr Reddog, May 6, 2013, downloaded at [https://www.experimentalbrew.com/content/no-boil-experiment].

(Continued)

*Primary Examiner* — Vera Stulii
(74) *Attorney, Agent, or Firm* — ArentFox Schiff LLP

(57) ABSTRACT

A method for treating a wort in a kettle provides a kettle with an inlet for feeding a wort into the kettle and with an outlet for flowing the wort out of the kettle. A heating means for bringing the wort contained in the kettle close to or at boiling temperature, as well as for controlling the temperature. A gas sparging system for sparging an inert gas into said wort. Feeding wort from a lautering step into said boiling kettle through the inlet, the wort at a temperature below its boiling temperature. During sparging, heating the wort and maintaining it at a treatment temperature below the boiling temperature of the wort for a duration between 15 and 90 min, and no longer than required to evaporate at most 4 wt. % of water initially in the wort. Transferring the treated wort to a trub separation step through the outlet.

14 Claims, 4 Drawing Sheets

(a)

(b)

(58) Field of Classification Search
USPC .................... 426/592, 11, 330.4, 16, 29
See application file for complete search history.

(56) References Cited

U.S. PATENT DOCUMENTS

| | | | |
|---|---|---|---|
| 6,032,571 | A | 3/2000 | Brous et al. |
| 9,587,210 | B2 | 3/2017 | Knudsen et al. |
| 2003/0044500 | A1 | 3/2003 | Seldeslachts |
| 2007/0134387 | A1 | 6/2007 | Stippler et al. |
| 2007/0154616 | A1 | 7/2007 | Hertel et al. |
| 2008/0275223 | A1 | 11/2008 | Adam et al. |
| 2013/0095207 | A1 | 4/2013 | Knudsen et al. |

FOREIGN PATENT DOCUMENTS

| | | |
|---|---|---|
| CN | 1200762 A | 12/1998 |
| CN | 1205031 A | 1/1999 |
| CN | 1875092 A | 12/2006 |
| DE | 102006033641 | 1/2008 |
| DE | 102008033287 A1 | 1/2010 |
| EP | 0873395 A1 | 10/1998 |
| EP | 0875560 | 11/1998 |
| EP | 1253194 A1 | 10/2002 |
| EP | 1420064 A1 | 5/2004 |
| GB | 190423597 | 8/1905 |
| GB | 2157314 A | 10/1985 |
| JP | 2007-537748 A | 12/2007 |
| WO | 9526395 A1 | 10/1995 |
| WO | 97/15654 A1 | 5/1997 |
| WO | 98/50521 A1 | 11/1998 |
| WO | 2009/031354 A1 | 3/2009 |

OTHER PUBLICATIONS

S. Grigsby, J. H., & Palamand, S. R. (1976). Studies on the Staling of Beer: The Use of 2-Thiobarbituric Acid in the Measurement of Beer Oxidation1. Journal of the American Society of Brewing Chemists, 34(2), 49-55.

"WBC 2008 program book", including the abstract of the poster presentation (D10), 1 page, Year:2008.

Achioku et al., "Development of new boiling technology to improve flavor stability", WBC 2008, poster presentation, 4 pages, Year:2008.

Colby, Chris, "Wort Boils above 212° F. (100° C.) (I: Theory)", Jul. 24, 2014, URL Link: https://beerandwinejournal.com/boil-theory, pp. 1-4.

Goldammer, Ted, "The Brewers Handbook- The Complete Book to Brewing Beer", The Brewers Handbook, Apex Publishers 2008, pp. 183, 195-199, 206-216, including cover page and printing details.

Hertel et al., "Low temperature wort flavour evaporation: A new dimension in evaportation efficiencies", Cerevisia, vol. 36, 2011, pp. 11-16.

Mezger, Ralf, "Betrachtung moderner Wiirzekochsj'steme bezuglich ihres Einflusses auf technologist and physiologisch bedeutende Wiirzeinhaltsstoffe", Thesis Technical University Munich, Dec. 19, 2005, 353 pages (177 pages of English Translation and 176 pages of Original Document).

Mitani et al., "Performance of wort boiling with inert gas sparging for the energy reduction", Sapporo Breweries Ltd., EBC congress 1999, conference proceedings, pp. 618-628.

Rennie. H., "Is Wort Boiling Necessary?", J. Inst. Brew., vol. 78, 1972, pp. 162-164.

Willaert R., "The Beer Brewing Process: Wort Production and Beer Fermentation", Handbook of Food Products Manufacturing, Ed. Y.H. Hui, John Wiley & Sons, 2007, pp. 444-506.

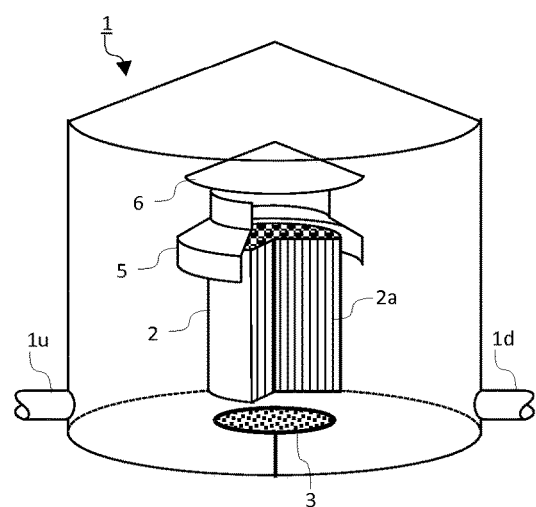
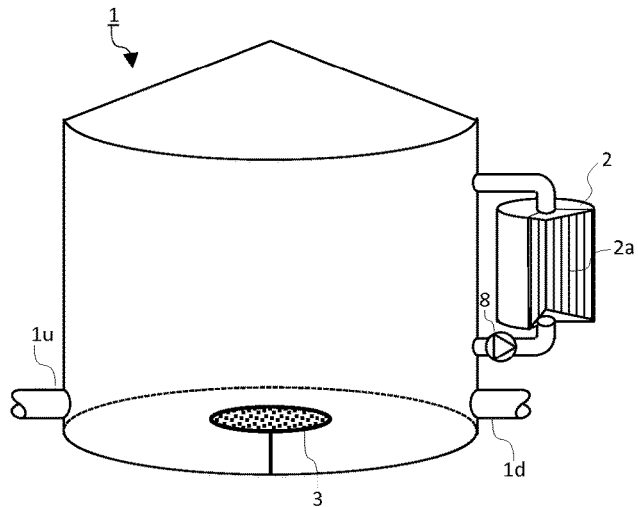
(a)            (a)
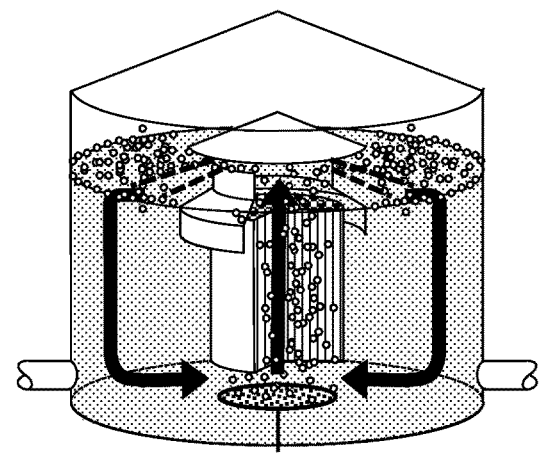
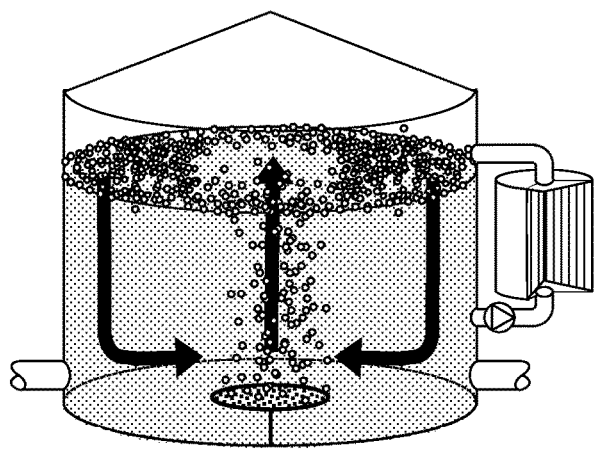
(b)            (b)
FIG.3            FIG.4

(a)

(b)

METHOD FOR TREATING A WORT IN A BOILING KETTLE

TECHNICAL FIELD

The present invention relates to an improvement of conventional wort boiling techniques in beer brewing processes. In particular it concerns such process which is substantially more economical in terms of energy consumption than hitherto achieved.

BACKGROUND FOR THE INVENTION

As shown in FIGS. 1, brewing a beer or a malt based beverage comprises feeding malt (100) to a grinder (200) which is then mixed with water and mashed (300) at a moderately high temperature to stop enzymatic conversion of starches into fermentable sugars. In the lautering step (400), the mash is separated into the clear liquid wort and the residual grain. The thus separated wort is then fed to a kettle (1), in a step traditionally referred to as "boiling" step because the wort is conventionally heated above its boiling temperature to sterilize it, terminate enzymatic activity, and convert and/or remove undesired components. After the boiling step, trub which has formed during the boiling step is separated from the wort usually in a whirlpool tun (500), as for example disclosed in DE10 2008 033 287. Wort is then cooled (600), fermented (700), matured (800), filtered (900) and packaged (1000), e.g., in bottles, kegs, cans, and the like.

The breweries in the globalizing world face numerous challenges, like the ever-increasing energy prices and complicated transportation due to exportation. The increased exportation forces the breweries to search for technological changes that improve the colloidal, microbial and flavour stability. Flavour stability is today not yet fully understood. It is known, however, that the wort boiling process (cf. FIG. 1, #1) has a major impact on beer flavour stability.

Wort boiling is one of the most energy-consuming process steps in the brewery. It serves several functions:
  (a) Wort sterilization,
  (b) Termination of enzymatic activity,
  (c) Isomerization of alpha acids into iso-alpha acids,
  (d) Coagulation of proteins and polyphenols,
  (e) Breakdown of S-methylmethionine (SMM) into dimethylsulfide (DMS),
  (f) Removal of unwanted flavor compounds.

Wort sterilization and termination of enzymatic activity are easily achieved when reaching temperatures of more than 90° C. The isomerization rate of hop acids is temperature dependent, roughly doubling every 10° C. Denaturation of enzymes and haze-active proteins with subsequent coagulation and precipitation with polyphenols must be completed during the wort boiling process. The coagulation process is dramatically enhanced when the interface between liquid and gas is enlarged. When wort reaches the boiling temperature, vapour bubbles provide this extra interface.

Breakdown of S-methylmethionine (SMM) to dimethylsulfide (DMS) which is very volatile is a necessary step prior to the evacuation of DMS. The most energy-requiring objective is the removal of unwanted flavour compounds, in particular DMS, but also other flavour compounds. Every volatile is determined by the vapour-liquid-equilibrium (VLE) of the component and wort, the latter being considered physically as almost identical to pure water. This means that a determined amount of evaporation is needed to reduce the level of an undesired compound to sub-threshold levels. There is therefore always a minimum evaporation required and most recent systems operate with a minimum of 4-6 wt. % evaporation during the boiling process.

Several wort boiling techniques are known in the art. For example, since the 1970's, a commonly applied boiling method is boiling with natural convection by means of an internal boiler. The internal boiler is cylindrically shaped formed by a bundle of hollow heated tubes, and wort can freely flow through these tubes. The working principle is of the 'thermosyphon' type, whereby wort enters the heating tubes, reaches boiling temperature and vapour bubbles will form and arise. These vapour bubbles (very low density) are the driving force upward through the internal boiler, thereby ensuring a natural convection. Alternatively, the boiler can be located outside the kettle and wort is fed therethrough by means of a pump and returned into the kettle.

In the last decade numerous new and innovative boiling systems have been introduced. They all focus on energy reduction by decreased evaporation and by reduction of thermal load measured on wort by the thiobarbituric acid (TBA) number method. Examples of modern wort boiling systems are based on: dynamic wort boiling; thin-film evaporation; external thermosyphon boiler with increased heating surface; continuous wort boiling; vacuum boiling, internal boiler with forced convection; gentle boiling with flash evaporation; and wort boiling with inert gas sparging. In particular, wort boiling with inert gas sparging consists of boiling wort for a duration of about 30 min at which point, while still boiling, an inert gas is sparged into the boiling wort, which considerably enhances the removal rate of DMS. The sparging is provided by a ring-structure located at the bottom of the wort kettle, such as disclosed in EP875560. Owing to the facilitated DMS removal, the boiling time can be shortened and evaporation rates could be reduced to about 4 wt. %.

Even with the latest wort boiling techniques, wort boiling remains the most energy-consuming step of the whole brewing process. There therefore remains in the art a clear need for a more economical treating process of wort issued from a lauter tun. The present invention proposes such process. This and other advantages are presented in the next sections.

SUMMARY OF THE INVENTION

The present invention is defined in the appended independent claims. Preferred embodiments are defined in the dependent claims. In particular, the present invention concerns a process for treating a wort in a kettle, said method comprising the steps of:
  (a) providing:
    a kettle provided with an inlet suitable for feeding a wort into the kettle and with an outlet suitable for flowing the wort out of the kettle,
    heating means suitable for bringing the wort contained in the kettle close to or at boiling temperature, as well as for controlling said temperature,
    a gas sparging system suitable for sparging an inert gas into said wort,
  (b) feeding wort from a lautering step into said boiling kettle through the inlet, said wort being at a temperature below its boiling temperature;
  (c) while sparging an inert gas through the wort, heating said wort to, and maintaining it at a treatment temperature, $T_a$, which is below the boiling temperature, $T_b$, of the wort for a duration, $t_{treat}$, comprised between 15 and 90 min, preferably between 20 and 75 min, more preferably between 30 and 60 min, and no longer than required to evaporate at most 4 wt. % of water initially present in the wort;

(d) transferring the treated wort to a trub separation step through the outlet.

The treatment temperature, $T_a$, is preferably greater than 90° C., preferably greater than 97° C., more preferably between ($T_b$-2° C.) and $T_b$, wherein $T_b$ is the boiling temperature of the wort. It is preferred that even after the treatment period, $t_{treat}$, the wort never reaches the boiling temperature, $T_b$, thereof during the whole duration of its residence in said boiling kettle.

The process of the present invention can be carried out in prior art kettles used for conventional boiling of wort, to which a gas sparging system is added. In particular, the kettle can be of the internal boiler type, comprising vertically oriented heating tubes through which flows the wort to be heated or to be maintained at elevated temperature. It is advantageous if said heating tubes are located directly above the gas sparger. Alternatively, the kettle can be of the external boiler type, comprising heating tubes through which flows the wort to be heated or to be maintained at elevated temperature, said heating tubes being located outside the kettle and in fluid communication therewith through tubing and a pump.

The inert gas can be sparged into the wort by means of a gas sparger located at the bottom of the kettle and oriented upwards or sideways in the radial direction, said sparger preferably comprising a circular plate, cylindrical or ring provided with a multitude of apertures. The apertures can be orifices or open pores of a sintered material, such as sintered stainless steel. In order to homogenize the temperature of the wort during the heating up stage, it is preferred that the inert gas sparging flow rate has an initial value upon introduction of the wort in the boiling kettle, which is highest and preferably comprised between 0.05 and 50 m³/h/hl wort, more preferably between 0.1 and 10 m³/h/hl. At the treatment temperature, $T_a$, is reached the gas flow rate may be decreased progressively to a value preferably comprised between 25 and 75%, more preferably between 37 and 45% of the initial value of the inert gas sparging flow rate. The inert gas is preferably nitrogen or carbon dioxide.

At the end of the process, the thus treated wort can then be transferred to a trub separation step, for example in a whirlpool tun, and then to further treatment vessels to produce a beer or a malt based beverage. The beer or malt based beverage thus produced preferably has one or more of the following properties:

(a) Foam stability (NIBEM) of at least 150 s;
(b) Haze measured on fresh beer or malt based beverage lower than 1.0 EBC; and/or
(c) Haze measured on beer or malt based beverage aged for 3 days at 60° C. lower than 1.5 EBC.

BRIEF DESCRIPTION OF THE FIGURES

For a fuller understanding of the nature of the present invention, reference is made to the following detailed description taken in conjunction with the accompanying drawings in which:

FIG. 3: Shows a first embodiment of an internal boiler kettle suitable for the present invention, (a) empty and (b) filled with wort and with gas being sparged therein.

FIG. 4: Shows a second embodiment of an external boiler kettle suitable for the present invention, (a) empty and (b) filled with wort and with gas being sparged therein.

DETAILED DESCRIPTION OF THE INVENTION

Figure 1:
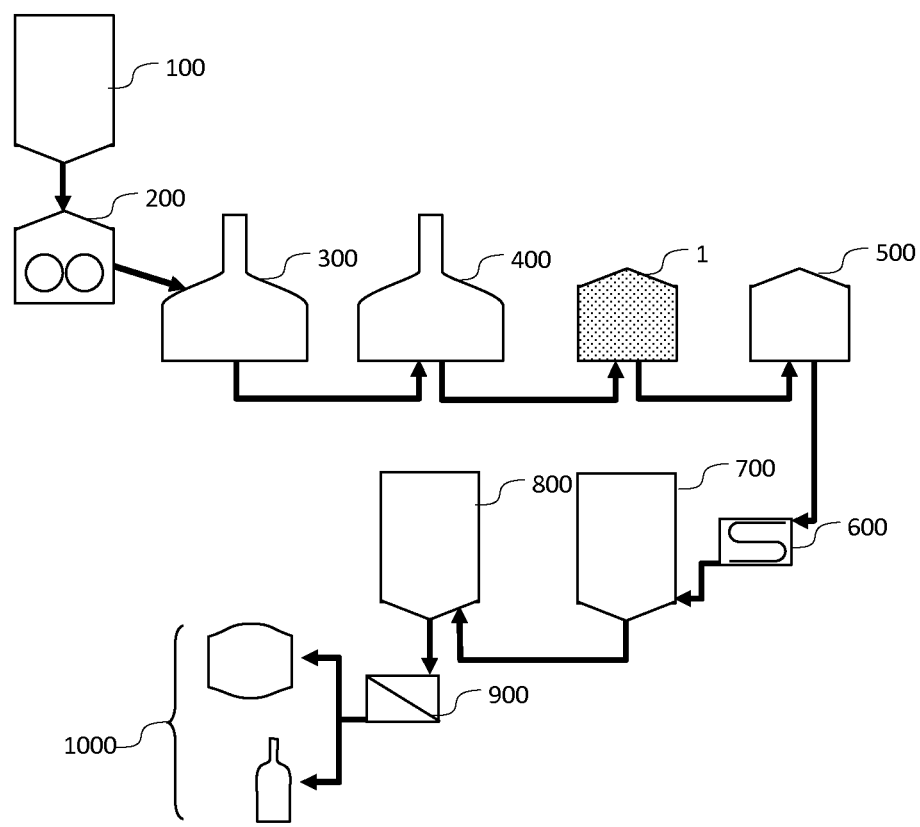
FIG. 1: shows the various steps of a brewing process.

As shown in FIG. 1, the present invention addresses the wort treatment step following lautering (400) and preceding trub separation (500) such as is most often performed in a whirlpool tun. It is clear that a buffer or pre-heating tank can be interposed between a lautering tun and the kettle (1) without changing anything to the present invention. The wort treatment step subject of the present invention is traditionally referred to as a "boiling" step because the wort is traditionally heated above its boiling temperature to sterilize it, terminate enzymatic activity, and convert and/or remove undesired components. In the present process, however, the term "pseudo-boiling" step is used instead because, contrary to the prior art processes, wort is not brought to its boiling temperature at any moment during the treatment time, $t_{treat}$.

The pseudo-boiling process of the present invention is meant to replace advantageously the boiling processes disclosed and used to date in the art, with a concomitant substantial reduction of the energy consumption. In particular, after both a boiling and a pseudo boiling step:

(a) The wort must be sterilized,
(b) the enzymatic activity, must be terminated
(c) the amount of alpha acids shall be reduced and replaced by iso-alpha-acids,
(d) a substantial amount of S-methylmethionine (SMM) must have been transformed into dimethylsulfide (DMS),
(e) haze active proteins and polyphenols must have been coagulated for separation, and
(f) unwanted flavour compounds, in particular DMS, shall be removed.

The above objectives (a) to (d) are mostly time-temperature dependent and can be achieved at temperatures above 90° C., with a rate increasing with the temperature. Coagulation of proteins and polyphenols and removal of unwanted volatile flavour components, on the other hand, are substantially accelerated when the interfacial area between liquid and gas is increased. For this reason, it is necessary to bring the wort to boiling in order to generate vapour bubbles which substantially increase the liquid-gas interfacial area, and hence the coagulation rate of haze active proteins and polyphenols, and removal rate of undesired volatile components. This method of boiling wort to increase the liquid-gas interfacial area works but has two major inconveniences:

(a) It is strongly energy consuming, and
(b) Water evaporation ranges from 4 wt. % for the most economical boiling systems, to 6-10 wt. % and more for more traditional boiling techniques.

Boiling water is very energy consuming. Wort physical heat properties are very comparable to those of water. Latent heat of vaporization of water (and wort) is very high: 2260 kJ/kg. It follows that if the heat required to heat 1 litre of wort by a temperature difference, dT, up to a temperature below the boiling temperature of wort, $T_b$, is Q=cp dT kJ/kg wherein cp is the specific heat of wort ($\simeq$4.19 kJ/kg ° C.), whilst 2260 kJ/kg are required by the system to turn said 1 litre of liquid water into vapour once the temperature of the wort has reached the boiling temperature, $T_b$. Note that since the boiling temperature of wort (and water) is pressure dependent, the actual value of $T_b$ varies as a function of the weather and location of the brewery. At atmospheric pressure, $T_b$=100° C., but it is clear that liquid wort will never reach such temperature in a brewery located in Mexico City or in Lhasa.

Removal of unwanted volatile flavour compounds such as DMS depends on the vapour-liquid equilibrium (VLE) of each volatile with wort. This means that a determined amount of evaporation is needed to reduce the level of an undesired compound to sub-threshold levels. Therefore a minimum evaporation is always required and most recent systems operate with a minimum of 4-6% evaporation, which is still a considerable amount.

Figure 5:
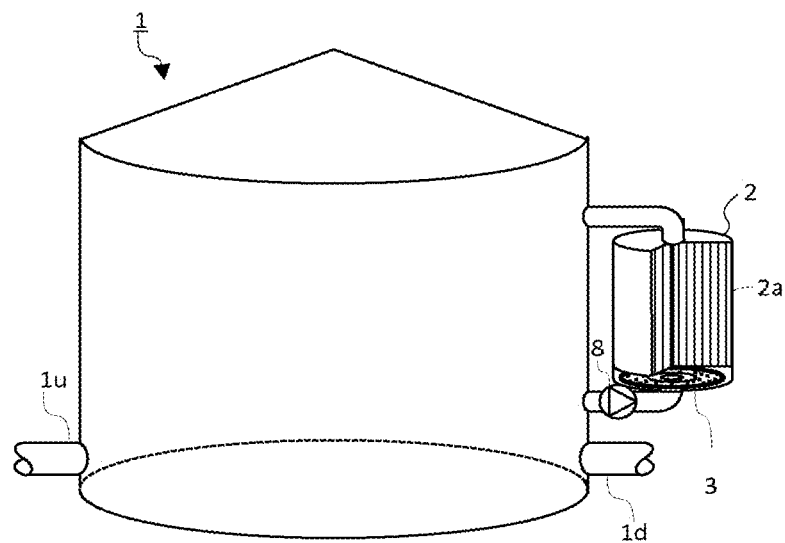
FIG. 5: Shows a third embodiment of an external boiler kettle suitable for the present invention, (a) empty and (b) filled with wort and with gas being sparged therein.
Figure 5:
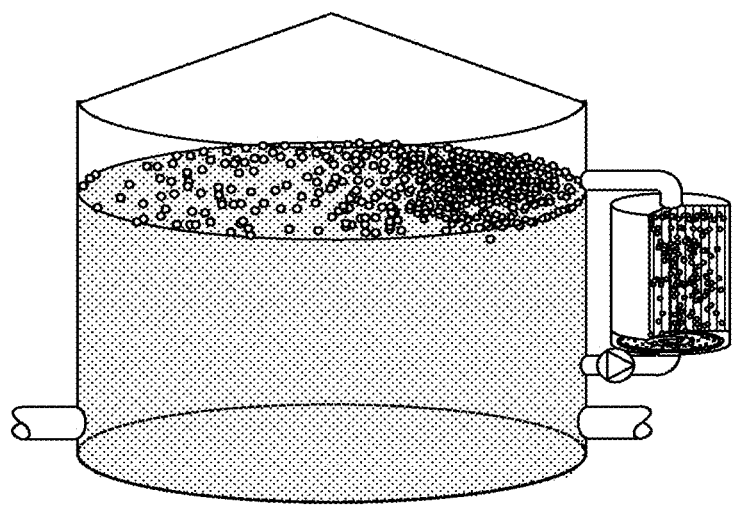

To carry out a process according to the present invention, a kettle (1) is required, which is provided with an inlet (1u) suitable for feeding a wort into the kettle and with an outlet (1d) suitable for flowing the wort out of the kettle. Heating means (2) suitable for heating the wort in the kettle must be provided. The heating means are generally in the form of a bundle of parallel jacketed hollow tubes, wherein the wort is circulated through the lumen of the hollow tubes which are heated by a heating fluid circulating in the jackets. The heating means (2) can be located inside the kettle, thus forming an internal boiler kettle as illustrated in FIG. 3(a). Due to their very low density these vapour bubbles are the driving force upward through the internal boiler, thereby ensuring a natural convection. In some systems of the prior art, a pump is located below the internal boiler to force wort collected at various points of the kettle to flow through the heating pipes. Though applicable, such forced convection system is not mandatory in the present invention because, as will be discussed below, the sparged gas bubbles create already a forced convection. Alternatively, the heating means (2) can be located outside the kettle, fluidly connected thereto by pipes, thus forming an external boiler kettle as illustrated in FIGS. 4(a)&5(a). A pump (8) is usually used to force wort flow through the boiler, Most kettles of the prior art, traditionally used to carry out a wort boiling step fulfill the foregoing requirements, The equipment required for the present invention requires a gas sparging system (3) suitable for sparging an inert gas into said wort. Although known in the art, such as disclosed in EP875560, few boiling kettles are provided with a gas sparging system. A gas sparging system can be very simple; and may include a circular plate, cylinder or ring provided with a multitude of apertures. The apertures can be through channels, like in a shower head, or they may be the pores of an open pore structure, such as a sintered material (e.g., sintered stainless steel). If the inert gas used is nitrogen, a nitrogen converter is very simple and inexpensive to install, and if $CO_2$ is used instead, it is clear that such gas is abundantly available in all breweries. An advantage of the present invention is therefore that it requires no or little modifications to the existing equipment. As shown in FIGS. 3(b) and 4(b), the gas sparger (3) is preferably located at the bottom of the kettle, so that the gas bubbles may rise to the surface of the wort, fixing on their way up volatiles and haze active proteins. In an alternative embodiment, illustrated in FIG. 5(a)&(b), an external boiler kettle is provided with a gas sparging system located at the upstream end of the external boiler with respect to the wort flow direction (in case of FIG. 5, at the bottom of the boiler). The bubbles are forced through the hollow heating tubes (2a) and injected into the kettle together with the wort. For kettles of the internal boiler type, it is preferred that the sparger be located below the heating tubes (2a) and preferably have a largest dimension (diameter in case of a disc, cylinder, or a ring) which is smaller than the largest diameter of the boiler (2). With such configuration, the gas bubbles rising through the hollow tubes (2a) of the internal boiler create a forced convection driving wort through the lumens of the hollow tubes of the boiler. This is very advantageous because, on the one hand, no immerged pump is required to create such forced convection and, on the other hand, the flowing rate of the wort through the hollow heating tubes during the heating stage is higher and more homogeneous compared with natural convection systems at temperature below, $T_b$, when insufficient vapour bubbles are present to create a natural convection with the risk of locally over-heating wort.

When a kettle provided with an internal boiler (2) is used, a baffle (5) and a deflector-roof (6) are preferably provided on top of the internal boiler in order to channel the flow of rising gas bubbles and wort, redistribute them over the top liquid-air interface of the wort, and reduce the thickness of the foam thus formed to permit better elimination in the air of the volatiles entrained with the bubbles (cf. FIG. 3(b)).

Figure 2:
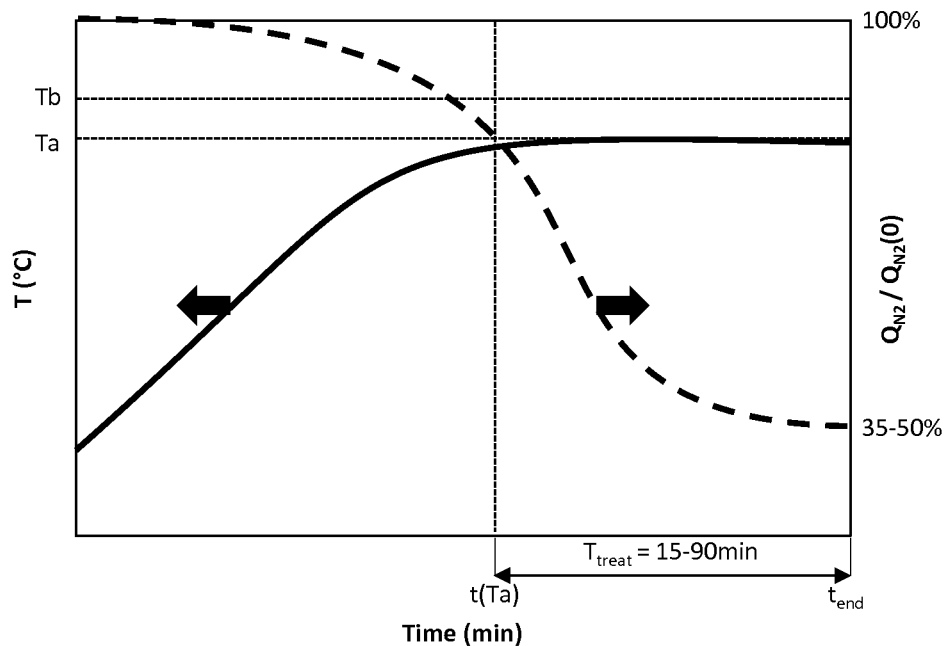
FIG. 2: is a schematic representation of a temperature profile of the wort and gas sparging flow rate during the whole process of the present invention.

Wort is fed to the kettle from a lautering step (400). In some cases, wort is first passed through a buffer or pre-heating tun prior to entering the kettle. The temperature of the wort is generally below 90° C., often comprised between 65 and 85 C. After filling the kettle (1) with wort, an inert gas is sparged into the wort and the latter is concomitantly heated to a treatment temperature, $T_a$, which is lower than the boiling temperature, $T_b$, of the wort, as illustrated in FIG. 2. When the wort has reached the treatment temperature, $T_a$, it is maintained at said temperature, $T_a$, still under flow of said inert gas, for a period of time, $t_{treat}$, comprised between 15 and 90 min, preferably, between 20 and 75 min, more preferably between 30 and 60 min. As mentioned above, the inert gas is preferably nitrogen or carbon dioxide, the former being more preferred.

As illustrated in FIG. 2, the inert gas flow rate is highest during the heating period of wort to temperature, $T_a$, and is decreased when the wort is maintained at temperature, $T_a$. The initial inert gas flow rate can be comprised between 0.05 and 50 m³/h/hl wort, more preferably between 0.1 and 10 m³/h/hl. Once the wort has reached its treatment temperature, $T_a$, the gas flow rate can be reduced to about 35 to 50%, more preferably between 37 and 45% of the initial value ($Q_{N2}(0)$), of the inert gas sparging flow rate.

The treatment temperature, $T_a$, according to the present invention is below boiling temperature, $T_b$, of the wort. In particular, it is preferably greater than 90° C., more preferably greater than 97° C. As discussed above, the rate of several of the reactions required to happen during the pseudo-boiling process are temperature dependent, such as sterilization, termination of enzyme activity, conversion of SMM into DMS, and the like. There is therefore a trade-off temperature value to be found wherein treatment time, $t_{treat}$, remains commercially reasonable and energy consumption is below today's levels. This trade off value of the treatment temperature, $T_a$, is preferably comprised between ($T_b$-2° C.) and the boiling temperature, $T_b$, of the wort. It is not excluded to heat the wort at the boiling temperature, $T_b$, after the treatment time, but in the vast majority of cases it is not necessary, and the excess energy required to boil the wort, even for a short time should be justified by some specific requirements of the treated wort.

As shown in FIGS. 3(b)&4(b), an inert gas sparger located at the bottom of the kettle generates a column of gas bubbles. The volatile components present in the wort are thus in equilibrium between gas and liquid phases without need for the wort to boil. As discussed above, the column of bubbles penetrating through the lumens of the hollow tubes of an internal boiler as depicted in FIG. 3(b), creates a forced convection independent of temperature, contrary to natural convection which is highly temperature dependent for the creation of sufficient vapour bubbles. On the other hand, inert gas bubbles act like vapour bubbles when surfacing, yielding the same effect as with the latter with respect to elimination of volatiles and coagulation of haze active proteins, but without having to boil and evaporate large amounts of wort. The gas flow is also advantageous because it homogenizes the wort by creating a gas lift system with a central ascending flow and a lateral descending flow, as illustrated by the black arrows in FIGS. 3(b)&4(b).

After the pseudo-boiling process of the present invention, wort can be fed to a whirlpool tun or the like for separating trub from clear wort, and thence proceed to fermentation (700), maturation (800), filtering (900) and packaging (1000) of the thus produced beer exactly in the same way as in the conventional brewing processes.

Example 1

5.4 hl wort issued from a lautering step was divided into two batches of 2.7 hl each. One was fed to a traditional boiling step, and is used as reference (=REX.1) and the other was treated with a pseudo-boiling process according to the present invention (=EX.1). The two batches were treated in identical internal boiler kettles (1), but the gas sparger (3) was not activated in the reference batch, REX1.

Boiling Process of REX.1

As wort level in the kettle reached the internal boiler, heat exchange occurred and wort was heated up to 100° C., whence wort started boiling intensively with high turbulences and was maintained in such state of ebullition during a treatment time, $t_{treat}$(REX1)=60 min. Dense water vapour was observed throughout the treatment period.

Pseudo-Boiling Process of EX.1

From the moment the spray head was below the level of wort, the sparging process was started with nitrogen at a flow rate of 0.1 m$_3$/h/hl. In order to ensure sufficient homogenization of the wort while heating up, forced convection is an absolute need during this phase. In the beginning, the maximum nitrogen flow rate is therefore applied.

When the heating proceeds towards the treatment temperature, $T_a$=98.5° C., the nitrogen flow rate can be decreased regularly until a flow rate of 40% of the initial value is obtained at 98° C. The magnitude of nitrogen flow has to be adjusted to the boiling-like state of the wort at 98.5° C. In this 'dynamic system, it appears that the wort is boiling already, yet from a thermodynamic point of view, such is not the case at all. The mixture of nitrogen and wort vapours ensures a very vigorous circulation. Hop addition can occur at any stage of the heating up phase. In Ex1 and REX1 hop was added as soon as the kettle was filled with wort.

The wort temperature was held at about 98.5° C., thereby maintaining the pseudo-boiling-like state during a treatment time, $t_{treat}$(EX1)=60 min. During the entire process, the wort appeared as if it were boiling very intensively with high turbulences like in the REX1, but by contrast, the rising vapours were very thin, resulting in very limited evaporation. Unwanted volatiles could thus be evacuated without an extensive evaporation rate.

Rising nitrogen bubbles also provide an interface for the orientation of denatured proteins responsible inter alia for haze formation in the beer, thus enhancing the coagulation thereof. Therefore coagulation can take place without attaining the boiling temperature since the nitrogen bubbles replace vapour bubbles.

Simultaneously, the bubble column provides forced convection, in the boiling kettle. Therefore intensive heating is not needed in order to create vapour bubbles as required for activating the thermosyphon principle in internal boiler kettles with natural convection. It is sufficient to provide enough heating fluid, such as steam, in the jackets of the hollow tubes (2a) forming the boiler (2) to only maintain the required temperature, Ta=98.5° C.

Beer Production

The batch treated according to the present invention (=EX1) registered an evaporation rate of 2.8 wt. %, whilst the batch used as reference (=REX.1) registered an evaporation rate of 10.8 wt. %. When comparing the pseudo-boiling process of EX.1 with the conventional wort boiling process of REX.1, it is imperative that all other beer production parameters are kept constant throughout the entire production process. For this reason, upon feeding the thus treated wort to a whirlpool tun (500), an amount of hot water (76° C.) was added to the wort of REX.1 in order to compensate for the density difference between the 2 worts due to the differing evaporation rates. After cooling, aerated wort was pitched with equal amounts of yeast slurry and the temperature profiles were kept equal during fermentation (700). After filtration (900) the final beers were bottled (1000) and a portion thereof subjected to accelerated (either thermal or oxidative) aging, prior to analysis.

Results

General quality parameters of beers produced from the worts treated in EX.1 and in REX.1 are listed in Table 1. The difference in evaporation is spectacular: 8% difference between 10.8 wt. % for REX.1 and 2.8 wt. % for EX.1. No significant changes in foam stability or haze stability could be observed. The haze stability of the beer of EX.1 was even slightly better than the reference. The colour of the EX.1 was substantially better than the one of REX.1 and the TBA increase of EX.1 was 28% lower the one of REX.1.

Foam stability was determined according to the NIBEM method described. The NIBEM Institute has set standards for the measurement of the foam stability. The NIBEM Foam Stability Tester measures the foam collapse time over a distance of 30 mm and is expressed in seconds.

Haze was measured using a Turbidity Meter which measures the scattered light caused by particles and incorporates the latest standards from MEBAK (Mitteleuropäische Brautechnische Analysekommission):
90° measuring angle
Red light 650±30 nm
Formazin calibration standard
Particles smaller than 1 μm, such as proteins, mainly cause scattered light and are measured under 90°. Particles larger than 1 μm, such as diatomaceous earth and yeast, mainly cause forward-scattered light and are measured under 25°. A sample (cuvette or bottle) is placed in the measuring chamber, which is filled with water. The automatic measurement proceeds, positioning the sample and rotating it, making 100 measurements, and calculating the average value.

The thiobarbituric acid number method (TBA) was carried out as described in Grigsby, J. H. and Palamand, S. R. *Studies on the Staling of beer: the use of 2-thiobarbituric acid in the measurement of beer oxidation*, ASBC J. (1975) 34 (2), 49-55. Five ml of a TBA solution (288 mg of thiobarbituric acid in 100 ml acetic acid (90%)) was added to 10 ml of wort in sealed pyrex tubes (in duplicate). The mixtures were kept in a water bath at 70° C. for 70 minutes. The samples were then cooled on ice. The foregoing thermal treatment permits the formation of complexes between TBA and hydroxymethylfurfural (HMF), the presence of the latter in the wort resulting from Maillard reactions, well known to the persons skilled in the art. The presence of HMF-TBA complexes can easily be identified and quantified by spectrophotometry as they are characterized by a strong absorption at a wavelength of 448 nm. If necessary, the samples were diluted in order to obtain a value in the linear range of the spectrophotometer. As blank measurement, absorption of the same wort with TBA but with no thermal treatment was measured at the same wavelength. The TBA value could then be calculated as follows TBA=10×(D×$A_{448}$(sample)−$A_{448}$(blank)), wherein D is a dilution factor, :$A_{448}$(sample) and $A_{448}$(blank) are the absorptions measured at 448 nm of the thermally treated wort+TBA solution samples and blank (wort+TBA solution not thermally treated), respectively.

TABLE 1

Comparison of quality parameters of beer brewed with wort according to EX1&REX. 1

| Parameter | EX1 | REX1 |
|---|---|---|
| evaporation, (wt. %) (↘) | 2.8 | 10.83 |
| foam stability (NIBEM), (s) (↗) | 269 | 274 |
| Haze (after 3 days at 60° C.), (EBC) (↘) | 0.51 | 0.58 |
| Haze (fresh beer), (EBC) (↘) | 0.29 | 1.01 |
| colour, (EBC) (↘) | 7.55 | 8.75 |
| thermal load during (pseudo) boiling, (ΔTBA) (↘) | 7.9 | 10.9 |
| 2-furfural (ppb) (↘) | 150 | 180 |
| phenylacetaldehyde (ppb) (↘) | 122 | 140 |
| linalool (ppb) (↗) | 135 | 87 |
| R = ΔDMS/% evaporation (ppb DMS/% vapour) (↗) | 11.4 | 4.8 |

(↗) high value desired,
(↘) low value desired

Figure 6:
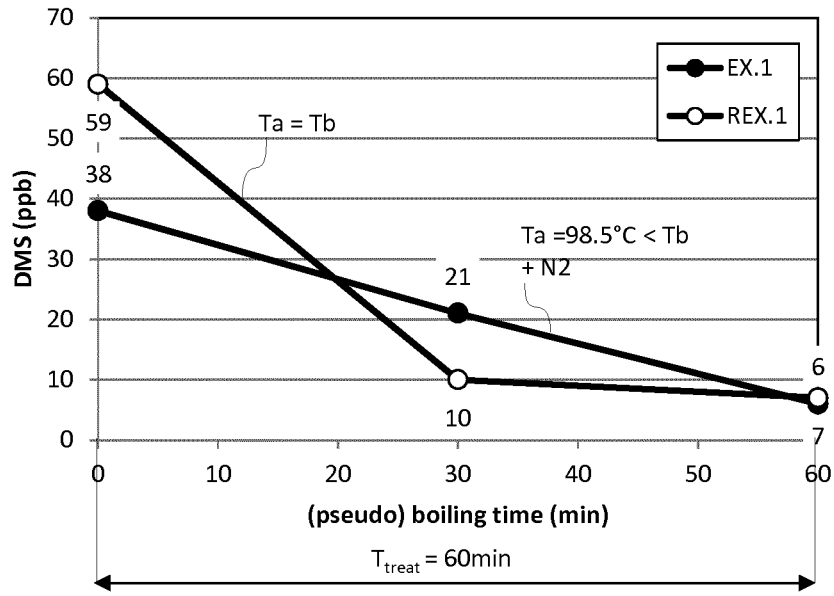
FIG. 6: shows the evolution of DMS content in the wort during $t_{treat}$.

The evaporation efficiency of a wort boiling system is mostly evaluated by the DMS removal during (pseudo-) boiling as a function of amount of wort evaporation. Samples were taken at the beginning (t=0 min), in the middle (t=30 min), and at the end (t=60 min) of treatment time, $t_{treat}$=60 min period. The amounts of DMS measured at different times are plotted in FIG. 6. At time, t=0 min, the wort treated according to the present invention (=EX.1, black circles)) contained 38 ppb DMS whilst at the same time, the wort which just reached its boiling temperature according to a conventional boiling process (REX.1, white circles) contained 59 ppb. This is explained because, whilst the two batches of wort had exactly the same content of 65 ppb of DMS upon entering the kettle (1), during the heating up stage of the wort to their respective treatment temperatures, $T_a$, DMS was already being actively removed by the nitrogen bubbles sparged in the wort during said stage (cf. FIG. 2), whilst in the absence of a sparging gas in REX.1, DMS content did not decrease significantly during the heating stage. After a treatment time, $t_{treat}$, of 60 min, the amounts of DMS left in the two wort batches were comparable with 6 ppb DMS in EX.1 and 7 ppb DMS in REX.1. The evaporation efficiency, R, can be characterized by the ratio of the amount of DMS removed during the (pseudo-) boiling stage, to the amount of water evaporated during the same time, R=ΔDMS/% evaporation, yielding 11.4 ppb DMS/% vapour for EX.1, versus 4.8 ppb DMS/% vapour for REX.1, i.e., EX.1 yields an evaporation efficiency 2.4 times higher than REX.1.

Beer Quality

In order to gain insight in the flavour stability of the produced beers, bottles of fresh beer were stored for 3 days at 60° C. and the amounts of furfural and phenylacetaldehyde were measured for beers of EX.1 and REX.1 (cf. last rows of Table 1). Furfural is generally regarded as an indicator compound for heat-induced flavour damage and phenylacetaldehyde, one of the Strecker aldehydes, is also suspected to be involved in flavour stability. Both compounds were found in higher amounts in fresh and aged reference beers. This was not unexpected, since these compounds are related to the total heat load, quantified by the TBA-value. Remarkably, the concentration of linalool and other hop flavour compounds (not listed) was up to 80% higher in the beer of EX.1 than in the REX.1 beer (cf. last row of Table 1). These terpenoid compounds are known to contribute positively to the overall beer flavour. It can be assumed that nitrogen bubbles are (fortunately) less efficient in removing such terpenoids than vapour bubbles.

The beers were also evaluated by a trained degustation panel. The fresh beer of EX.1 had a high overall score of 7.1 comparing to the reference beer scoring 6.6. This is certainly, at least in part, due to the higher retention of beneficial hop volatiles or the reduced bitterness in the beer of EX.1. After aging, the beer of EX.1 scored slightly higher than the reference beer of REX.1 with 3.9 vs. 3.5, respectively. The panel concluded that the intensity of overall aging, Maillard components and aldehydes was slightly higher in the reference beer (=REX.1), while the old hop flavour became more apparent in the beer of the present invention (=EX.1). Strikingly, the sulfury, hay-like aging flavour was substantially more dominant in the reference beer (REX.1). Apparently, sulfury flavours or their precursor compounds were driven off more completely by the pseudo-boiling process with nitrogen sparging of the present invention (=EX.1) than by the conventional boiling process of the reference example, REX.1.

Example 2

Figure 7:
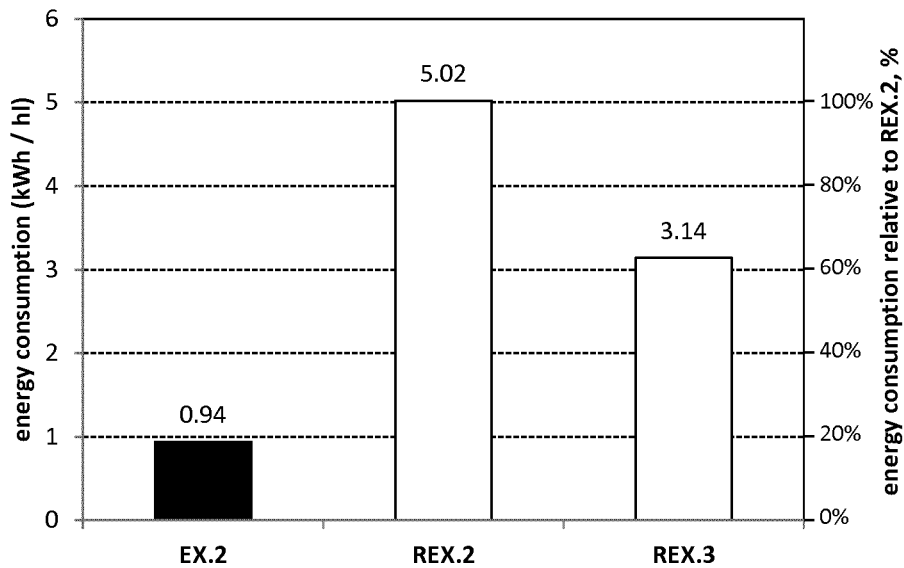
FIG. 7: compares the energy consumption of a pseudo-boiling process according to the present invention with the one of a boiling process carried out with natural and forced convection, respectively.

The boiling experiment carried out in a pilot plant of EX.1 was repeated in a full scale brewhouse equipment. After pseudo-boiling wort during a time, $t_{treat}$, of 60 min according to the present invention, the evaporation rate was 1.5 wt. % (=EX.2). A conventional boiling process of the type used in REX.1 using an internal boiler kettle with natural convection (=REX.2) yielded an evaporation rate of 8 wt. %. The same experiment was carried out with an internal boiler kettle with forced convection (i.e., wherein wort is driven through the boiler heated tubes by a pump) (=REX.3) yielding an evaporation rate of 5 wt. %. Table 2 compares the energy consumptions of the three (pseudo-) boiling processes of EX.2, and REX.2&3. It can be seen that the pseudo-boiling process of the present invention consumes only 19% of the energy consumed by conventional boiling process with natural convection (REX.2) and about a third of the energy consumed by a boiling process with forced convection (REX.3). FIG. 7 compares graphically the absolute and relative energy consumptions of EX.2 (black column) and REX.2&3 (white columns).

TABLE 2 comparison of energy consumption between boiling and pseudo-boiling processes

|   | EX. 2 INV | REX. 2 internal boiler with natural convection | REX. 3 internal boiler with forced convection |
|---|---|---|---|
| evaporation (wt. %) | 1.5 | 8 | 5 |
| energy consumption (kJ/hl) | 3,387 | 18,063 | 11,290 |
| energy (kWh/hl) | 0.94 | 5.02 | 3.14 |
| relative energy consumption (relative REX. 2) (%) | 19% | 100% | 63% |
| consumption for 400,000 hl (MWh) | 376 | 2,007 | 1,254 |

The pseudo-boiling process of the present invention is an advantageous alternative to conventional wort boiling yielding beer of comparable quality with over 80% energy saving. All observed quality parameters of the produced worts and beers according to the present invention were comparable or better than their corresponding reference beers, while the evaporation rate of the pseudo-boiling process was only 20 to 30% of the reference evaporation rate. The potential energy savings of the process of the present invention are very high (up to 4 kWh/hL), which is an asset, since energy becomes more expensive every day.

The pseudo-boiling process of the present invention combines the advantages of wort boiling systems with forced convection, hot holding or stripping and provides an excellent means to meet the requirements of wort boiling:

Evacuation of volatiles is enhanced without the need for extensive evaporation and thus, energy.

Forced convection is ensured by a continuous upward stream of nitrogen bubbles (gas lift). The convection is therefore completely independent of the heating intensity No boiling temperature is needed. Hot holding is sufficient.

Coagulation of proteins occurs without the presence of vapour bubbles. The small nitrogen bubbles provide a large interface, which allows the denatured proteins to coagulate. The results of the final beers show good haze and foam stability (cf. Table 1).

The invention claimed is:

1. A method for treating a wort in a kettle comprising:
   (a) providing:
      a kettle provided with an inlet suitable for feeding a wort into the kettle and with an outlet suitable for flowing the wort out of the kettle,
      heating means suitable for bringing the wort contained in the kettle close to or at boiling temperature, as well as for controlling said temperature,
      a gas sparging system suitable for sparging an inert gas into said wort,
   (b) feeding wort from a lautering step into said boiling kettle through the inlet, said wort being at a temperature below its boiling temperature, $T_b$;
   (c) while sparging an inert gas through the wort, heating said wort to, and maintaining it at a treatment temperature, $T_a$, which is below the boiling temperature, $T_b$, of the wort for a treatment time, $t_{treat}$, comprised between 15 and 90 min, and no longer than required to evaporate at most 4 wt. % of water initially present in the wort; and,
   (d) transferring the treated wort to a trub separation step through the outlet, wherein the wort does not reach the boiling temperature, $T_b$, during the method, and wherein the treatment temperature, $T_a$, is between $(T_b - 2° C.)$ and $T_b$.

2. The method according to claim 1, wherein the inert gas is sparged into the wort by means of a gas sparger located at a bottom of the kettle and oriented upwards, said sparger preferably comprising a circular plate, cylinder or ring provided with a multitude of apertures.

3. The method according to claim 2, wherein the kettle is of an internal boiler type, comprising vertically oriented heating tubes through which the wort to be heated or to be maintained at elevated temperature flows, said heating tubes being located above the gas sparger.

4. The method according to claim 2, wherein the kettle is of an external boiler type, comprising heating tubes through which the wort to be heated or to be maintained at elevated temperature flows, said heating tubes being located outside the kettle and in fluid communication therewith through tubing and a pump.

5. The method according to claim 1, wherein an inert gas sparging flow rate has an initial value upon introduction of the wort in the boiling kettle, which is a highest value and decreases progressively as the wort reaches its treatment temperature, $T_a$.

6. The method according to claim 1, wherein the treatment time, $t_{treat}$, is comprised between 20 and 75 min.

7. The method according to claim 1, wherein the inert gas is nitrogen or carbon dioxide.

8. The method according to claim 1, wherein the thus treated wort is transferred to a whirlpool and then to further treatment vessels to produce a beer or a malt based beverage.

9. The method according to claim 8, wherein the beer or malt based beverage has one or more following properties:
   (a) Foam stability (NIBEM) of at least 150 s;
   (b) Haze measured on fresh beer or malt based beverage lower than 1.0 EBC; and/or
   (c) Haze measured on beer or malt based beverage aged for 3 days at 60° C. lower than 1.5 EBC.

10. The method according to claim 1, wherein an inert gas sparging flow rate is comprised between 0.05 and 50 m³/h/hl wort and decreases progressively as the wort reaches its treatment temperature, $T_a$, to a value preferably comprised between 25 and 75%.

11. The method according to claim 1, wherein an inert gas sparging flow rate is between 0.1 and 10 m³/h/hl wort and decreases progressively as the wort reaches its treatment temperature, $T_a$, to a value preferably comprised between 25 and 75% of an initial value of the inert gas sparging flow rate.

12. The method according to claim 1, wherein an inert gas sparging flow rate is comprised between 0.05 and 50 m³/h/hl wort and decreases progressively as the wort reaches its treatment temperature, $T_a$, to a value preferably comprised between 37 and 45% of an initial value of the inert gas sparging flow rate.

13. The method according to claim 1, wherein an inert gas sparging flow rate is between 0.1 and 10 m³/h/hl wort and decreases progressively as the wort reaches its treatment temperature, $T_a$, to a value preferably comprised between 37 and 45% of an initial value of the inert gas sparging flow rate.

14. The method according to claim 1, wherein a treatment time, $t_{treat}$, is comprised between 30 and 60 min.

* * * * *